(12) United States Patent
Hilliard

(10) Patent No.: US 12,724,465 B2
(45) Date of Patent: Sep. 1, 2026

(54) COMPUTING DEVICE

(71) Applicant: LENOVO (SINGAPORE) PTE, LTD., Singapore (SG)

(72) Inventor: Matthew Sean Hilliard, Morrisville, NC (US)

(73) Assignee: LENOVO (SINGAPORE) PTE. LTD., Singapore (SG)

(*) Notice: Subject to any disclaimer, the term of this patent is extended or adjusted under 35 U.S.C. 154(b) by 205 days.

(21) Appl. No.: 18/395,682

(22) Filed: Dec. 25, 2023

(65) Prior Publication Data

US 2025/0208664 A1 Jun. 26, 2025

(51) Int. Cl.
*G06F 1/16* (2006.01)

(52) U.S. Cl.
CPC .......... *G06F 1/1681* (2013.01); *G06F 1/1616* (2013.01)

(58) Field of Classification Search
CPC combination set(s) only.
See application file for complete search history.

(56) References Cited

U.S. PATENT DOCUMENTS 8,108,017 B2 * 1/2012 Jang ...................... G06F 1/1698 455/90.3
8,265,719 B2 * 9/2012 Lindvall ............. H04M 1/0237 455/575.4
9,094,490 B2 * 7/2015 Sayama .............. H04M 1/0216
11,016,530 B2 * 5/2021 Watamura ............. G06F 1/1652
12,306,671 B2 * 5/2025 Caplow-Munro .... G06F 1/1641
2009/0227301 A1 * 9/2009 Lindvall ............... G06F 1/1616 16/221
2013/0192140 A1 * 8/2013 Sayama ................ G06F 1/1624 49/386
2016/0041589 A1 * 2/2016 Tazbaz .................. H04M 1/022 361/679.06
2023/0393624 A1 * 12/2023 Caplow-Munro .... H04M 1/022
2023/0393633 A1 * 12/2023 Caplow-Munro .... G06F 1/1652
2025/0208664 A1 * 6/2025 Hilliard ................. G06F 1/1616

OTHER PUBLICATIONS

EP Application No. 24214021.8-1218, Extended European Search Report, Apr. 23, 2025 (15 pages).

* cited by examiner

*Primary Examiner* — Lisa Lea-Edmonds
(74) *Attorney, Agent, or Firm* — Brian J. Pangrle

(57) ABSTRACT

A computing device can include a first housing, a first component pivot and a second component pivot of a four-bar linkage, where the first housing forms a first bar; a second housing that includes a hinge recess that includes a first component pivot and a second component pivot of the four-bar linkage, where the second housing forms a second bar; a first hinge component coupled to the first component pivots to form a third bar, where the first hinge component includes a second component stop surface and a stop that contacts a stop surface of the first housing in a fully open position of the housings; and a second hinge component coupled to the second component pivots to form a fourth bar, where the second component includes a stop that contacts the second component stop surface in the fully open position of the housings.

20 Claims, 10 Drawing Sheets

COMPUTING DEVICE

TECHNICAL FIELD

Subject matter disclosed herein generally relates to technology for computing devices.

BACKGROUND

A computing device can include a display housing assembly and a keyboard housing assembly that are coupled via one or more hinge assemblies. For example, a laptop computing device (e.g., a laptop computer) can be a clamshell device with such housing assemblies.

SUMMARY

A computing device can include a first housing that includes a hinge recess that includes a stop surface, a first component pivot and a second component pivot of a four-bar linkage, where the first housing forms a first bar; a second housing that includes a hinge recess that includes a first component pivot and a second component pivot of the four-bar linkage, where the second housing forms a second bar; a first hinge component coupled to the first component pivots to form a third bar, where the first hinge component includes a second component stop surface and a stop that contacts the stop surface of the hinge recess of the first housing in a fully open position of the first housing and the second housing; and a second hinge component coupled to the second component pivots to form a fourth bar, where the second component includes a stop that contacts the second component stop surface in the fully open position of the first housing and the second housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
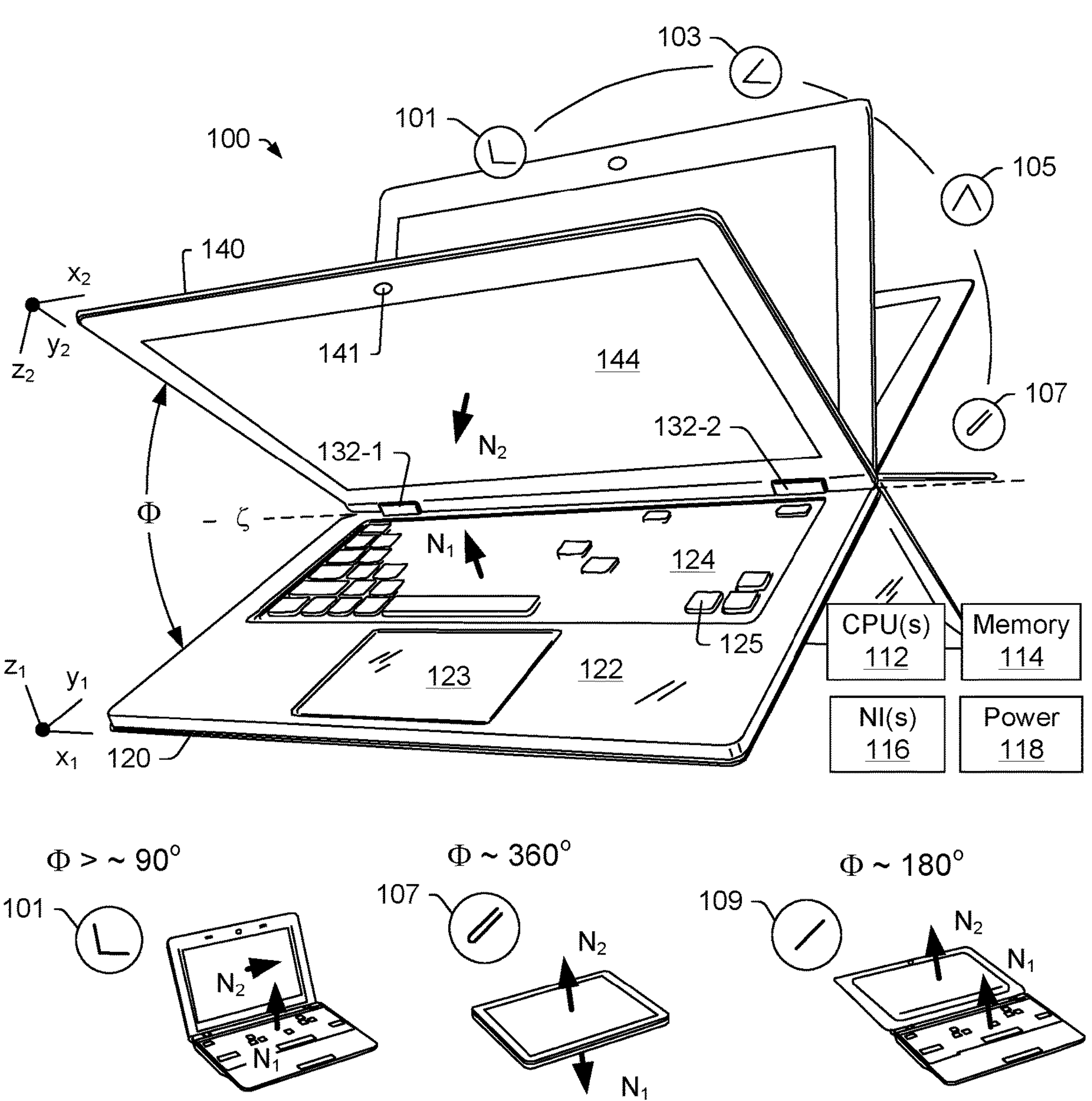
FIG. 1 is a diagram of an example of a computing device.

FIG. 1 shows an example of a computing device 100 (e.g., a computing system) that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces (NIs) 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing system; noting that some clamshell computing systems may be limited in open angle orientations. For example, a clamshell computing system may be able to be opened to the orientation 109 (e.g., substantially 180 degrees) without being able to be opened to the orientation 107 (e.g., substantially 360 degrees).

As shown in FIG. 1, the orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a “tent” orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the computing device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the user’s hand or hands. A user may perceive the springiness of the keys 125 as being somewhat undesirable. For example, springy keys may interfere with a user’s ability to comprehend or sense force that is sufficient to grasp the computing device 100, which may cause the user to grasp too lightly or to grasp too strongly, which may possibly impact integrity of the keys (e.g., springs, spring-mechanisms, contacts, etc.). In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis z) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
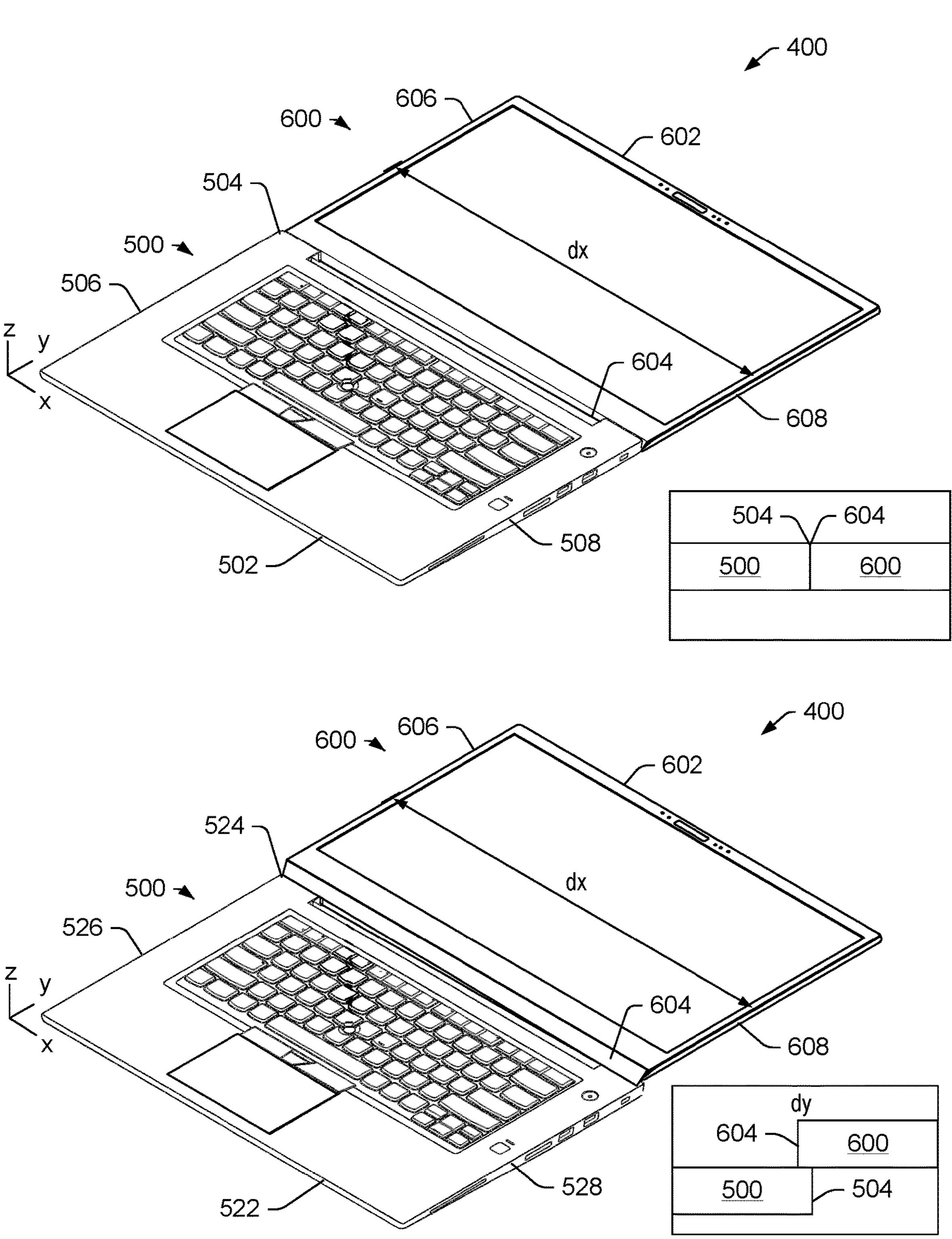
FIG. 2 is a series of diagrams of an example of a computing device or computing system.

FIG. 2 shows an example of a computing device 400 that includes a base housing 500 and a display housing 600 that can be coupled together via one or more hinge assemblies. As shown, the base housing 500 can include a front edge 502, a back edge 504 and opposing side edges 506 and 508 and the display housing 400 can include a front edge 602, a back edge 604 and opposing side edges 606 and 608. In the example of FIG. 2, the back edges 504 and 604 can be hinge side edges where one or more hinge assemblies couple the housings 500 and 600 together.

As shown, the computing device 400 may include one or more hinge assemblies that can provide for a substantially planar arrangement of the housing 500 and 600 when opened to approximately 180 degrees or, for example, the computing device 400 may include one or more hinge assemblies that can provide for a stepped arrangement of the housings 500 and 600 when opened to approximately 180 degrees. In the non-stepped arrangement, if the back edge 504 includes any features, these may become inaccessible once the computing device 400 is opened to approximately 180 degrees; whereas, in the stepped arrangement, if the back edge 504 includes any features, these may still be accessible once the computing device 400 is opened to approximately 180 degrees.

As to some examples of back edge features, these may include one or more vents, one or more connectors, one or more memory card slots, etc. Thus, in some instances, a stepped arrangement may provide some benefits over a non-stepped arrangement.

As shown in FIG. 2, the housings 500 and 600 may have a housing width dx, which may be approximately the same (e.g., plus or minus less than 5 mm). As to the stepped arrangement, a step dimension dy may be greater than approximately 1 mm (e.g., plus or minus 0.5 mm) and less than approximately 10 mm (e.g., plus or minus 2 mm). As an example, in a stepped arrangement, the housings 500 and 600 may contact each other over at least a portion of a step dimension (e.g., a step distance). As an example, one or more step surfaces may provide for contact that helps to limit further opening of the computing device 400 beyond approximately 180 degrees. As an example, one or more hinge assemblies may include one or more features that provide for limiting opening of the computing device 400 to beyond approximately 180 degrees.

Figure 3:
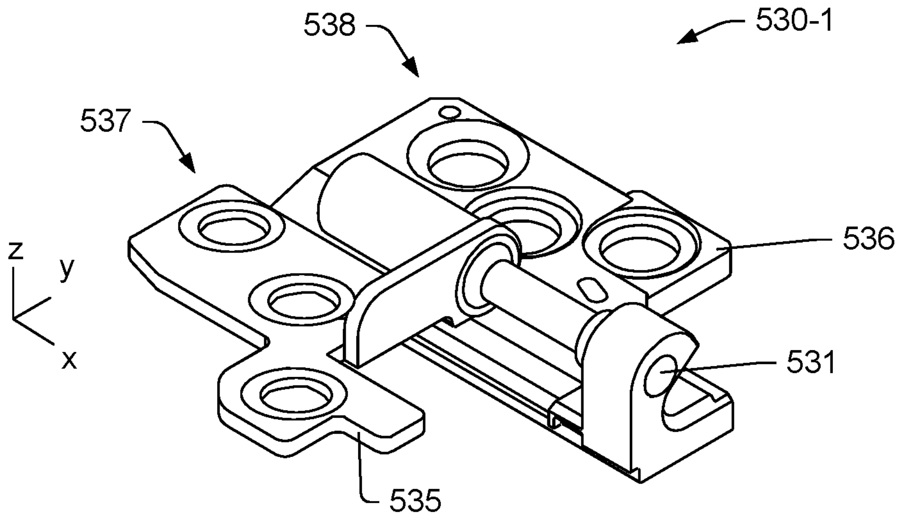
FIG. 3 is a series of diagrams of example of hinge assemblies.
Figure 3:
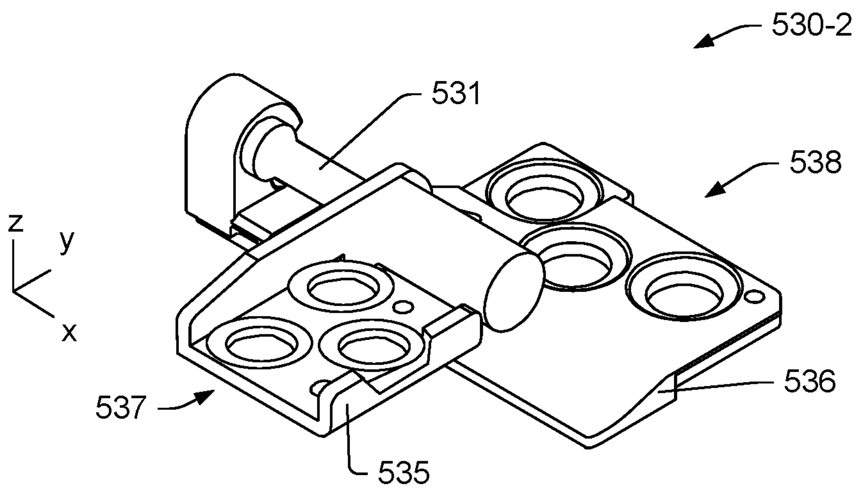

FIG. 3 shows perspective views of example hinge assemblies 530-1 and 530-2. As shown, each of the hinge assemblies 530-1 and 530-2 can include an axle 531 that defines a rotational axis for a base housing leaf 535 and a display housing leaf 536 where each of the leaves 535 and 536 can include respective openings 537 and 538 for receipt of one or more fasteners to thereby couple the leaves 535 and 536 to a respective housing. As an example, one or more fasteners may be cooperatively coupled to a respective housing using one or more hinge mount features.

Figure 4:
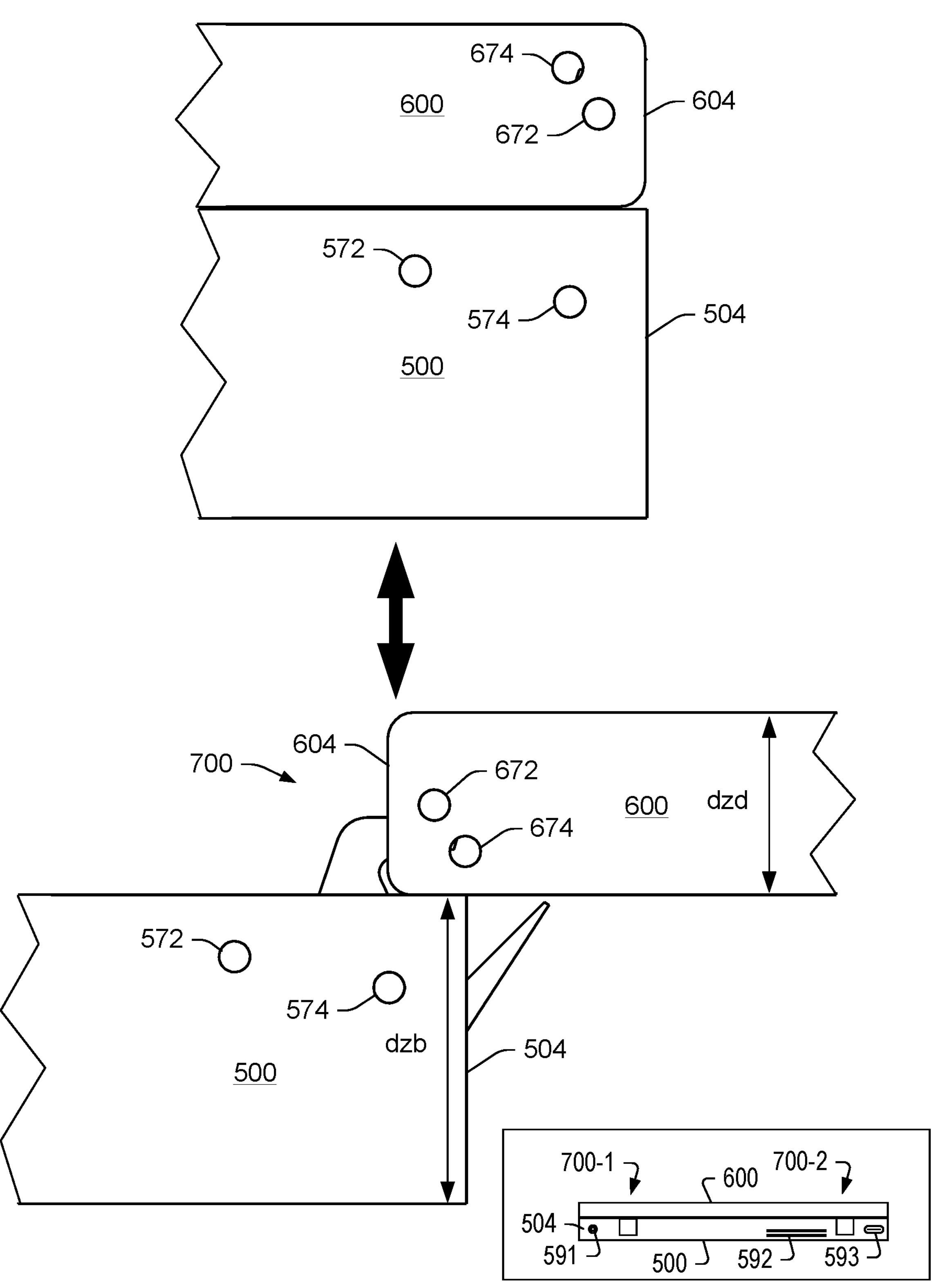
FIG. 4 is a series of diagrams of an example of a computing device.

FIG. 4 shows an example of a portion of a computing device that includes a base housing 500 and a display housing 600 along with a hinge assembly 700 that couples the housings 500 and 600 together. As shown, the hinge assembly 700 provides for a closed position where the edges 504 and 604 may be stacked and aligned and provides for an open position where the edges 504 and 604 may be offset to define a step, as in a stepped arrangement.

As shown in the example of FIG. 4, the base housing 500 may have a thickness or height dzb at or near the back edge 504 and the display housing 600 may have a thickness or height dzd at or near the back edge 604. As shown, in the open position, the back edge 504 may be exposed. As shown in the example of FIG. 4, the back edge 504 may include one or more features, such as, for example, one or more ports 591 and 593 and/or one or more vents 592. As an example, a device may include one or more instances of the hinge assembly 700, for example, consider the one or more hinge assemblies 700-1 and 700-2.

As shown in the example of FIG. 4, the display housing 600 can include pivots 672 and 674 and the base housing 500 can include pivots 572 and 574. As an example, the hinge assembly 700 may be a multi-bar linkage. For example, the hinge assembly 700 may be a four-bar linkage where the pivots 572, 574, 672 and 674 are four pivots of the four-bar linkage.

As an example, a device may include a first housing that includes a hinge recess that includes a stop surface, a first component pivot and a second component pivot of a four-bar linkage, where the first housing forms a first bar; a second housing that includes a hinge recess that includes a first component pivot and a second component pivot of the four-bar linkage, where the second housing forms a second bar; a first hinge component coupled to the first component pivots to form a third bar, where the first hinge component includes a second component stop surface and a stop that contacts the stop surface of the hinge recess of the first housing in a fully open position of the first housing and the second housing; and a second hinge component coupled to the second component pivots to form a fourth bar, where the second component includes a stop that contacts the second component stop surface in the fully open position of the first housing and the second housing. In such an example, one of the housings may be a base housing and another one of the housings may be a display housing that, for example, together form a computing device.

Figure 5:
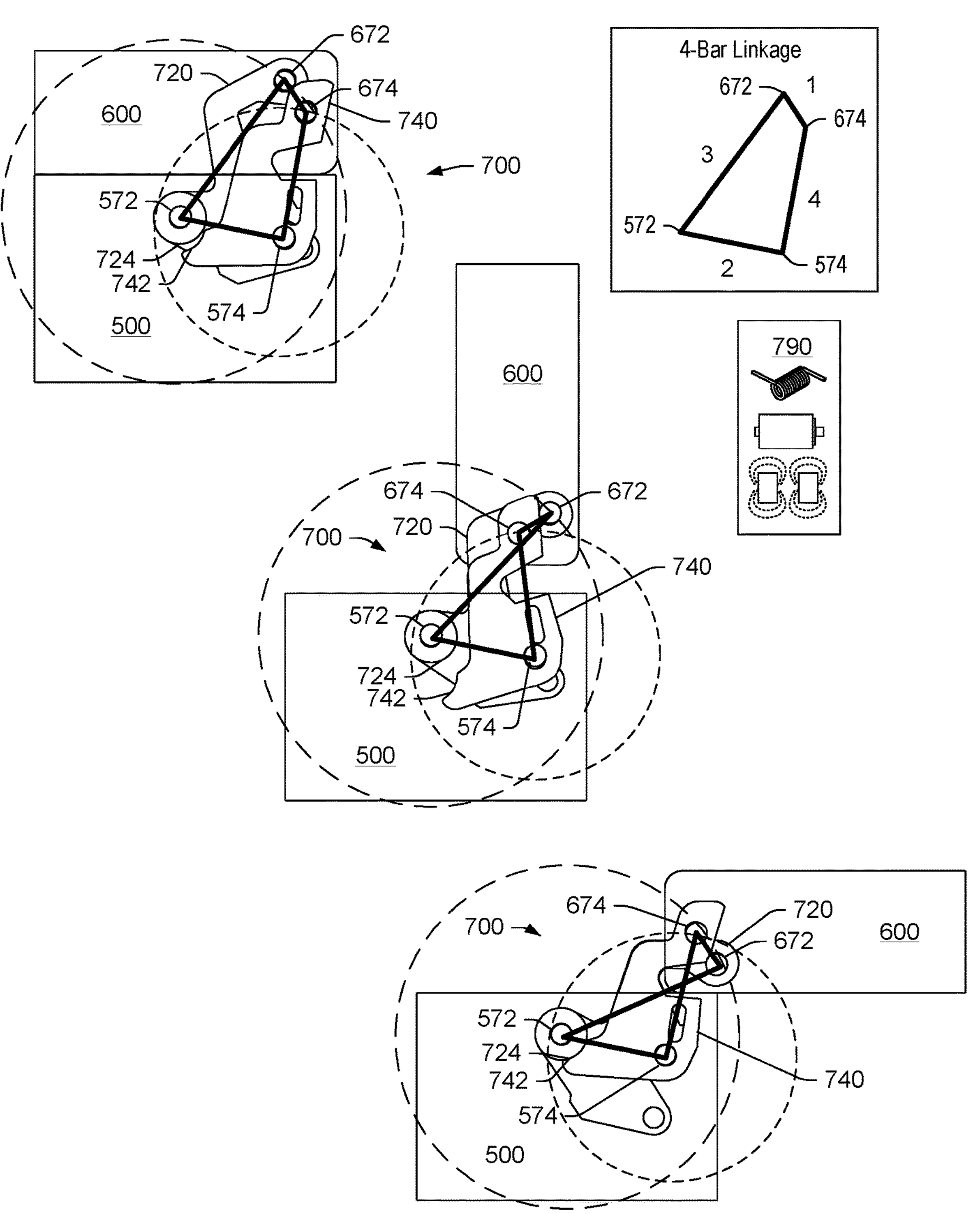
FIG. 5 is a series of diagrams of an example of a computing device.

FIG. 5 shows an example of the hinge assembly 700 with respect to the base housing 500 and the display housing 600 as transitioning from a closed position, to a first open position to a second open position, which may be an approximately 180 degree position.

In the example of FIG. 5, thick black lines illustrate bars of a four-bar linkage of the hinge assembly 700, which are shown with respect to the pivots 572, 574, 672 and 674. As shown, from a side view of bars labeled 1, 2, 3 and 4, the bars labeled 3 and 4 can be uncrossed in the closed position and crossed in one or more open positions.

As shown in FIG. 5, a device may include the housing 600 as a second housing with the pivot 672 as a first component pivot (e.g., for a first hinge component 720) and the pivot 674 as a second component pivot (e.g., for a second hinge component 740) of a four-bar linkage, where the housing 600 forms a first bar. Further, the device may include the housing 500 as a first housing that includes the pivot 572 as a first component pivot (e.g., for the first hinge component 720) and the pivot 574 as a second component pivot (e.g., for the second hinge component 740) of the four-bar linkage, where the housing 500 forms a second bar.

As shown in FIG. 5, the first hinge component 720 can be coupled to the first component pivots 572 and 672 to form a third bar, where the first hinge component 720 includes a second component stop surface 724 that contacts a stop 742 of the second hinge component 740 in a fully open position of the housings 500 and 600. Further, as shown, the second hinge component 740 can be coupled to the second component pivots 574 and 674 to form a fourth bar, where the second component 740 includes the stop 742 that contacts the second component stop surface 724 in the fully open position of the housings 500 and 600. In such an example, one of the housings may be a base housing and another one of the housings may be a display housing that, for example, together form a computing device.

In the example of FIG. 5, the first bar may be defined by a bar length that is between the pivots 672 and 674 while the second bar may be defined by a bar length that is between the pivots 572 and 574. In the example of FIG. 5, dashed circles are shown, each with a respective radius. In particular, one of the dashed circles is centered on the pivot 572 with a radius defined by the pivot 672 (e.g., corresponding to a length of the third bar) while another one of the dashed circles is centered on the pivot 574 with a radius defined by the pivot 674 (e.g., corresponding to a length of the fourth bar).

As shown in the example of FIG. 5, the hinge assembly 700 can provide for lifting the display housing 600 a distance away from the base housing 500 when in an intermediate position such that a clearance is generated for the edge 604 of the display housing 600 to clear a surface of the base housing 500. Such a clearance can allow for a corner of the display housing 600 to swing into the clearance in route to the stepped open position. In the example of FIG. 5, as the display housing 600 is lifted, it may be substantially over the base housing 500, for example, within a footprint of the base housing 500 where a back side of the display housing 600 does not pass outwardly beyond the back edge 504 of the base housing 500.

FIG. 5 also shows various examples of biasing components 790, which may include one or more springs, one or more electric motors, one or more magnets and/or ferromagnetic materials, etc. As an example, a spring may be a torsion type of spring that may be positioned with respect to a pivot to bias a component or components, for example, to assist with movement of the hinge assembly 700 toward a position (e.g., closed position, open position, etc.) and/or to help maintain a component or components at a position. As an example, an electric motor may be actuatable responsive to a signal to cause movement of a component or components of the hinge assembly 700 toward a position (e.g., closed position, open position, etc.) and/or to help maintain a component or components at a position. As an example, one or more magnets (e.g., permanent, electro-permanent, electric, etc.) may be utilized to cause movement of a component or components toward a position (e.g., closed position, open position, etc.) and/or to help maintain a component or components at a position. As an example, a housing or housings may include one or more magnets and/or ferromagnetic materials that may operate as a latch to maintain housings in a closed position, where, for example, upon release of the latch, a hinge assembly or hinge assemblies may be forcibly biased to cause one housing to transition to an open position with respect to another housing.

Figure 6:
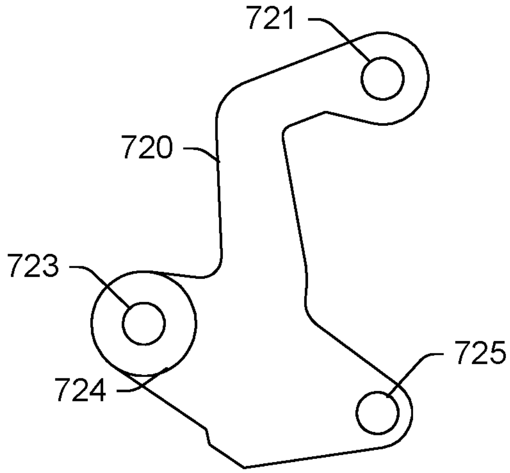
FIG. 6 is a series of diagrams of examples of components of an example of a hinge assembly.
Figure 6:
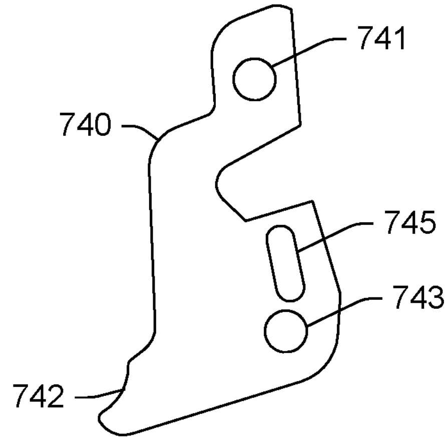

FIG. 6 shows side views of the first hinge component 720 and the second hinge component 740. As shown, the first hinge component 720 includes a feature 721 for the pivot 672 and a feature 723 for the pivot 572 and the second hinge component 740 includes a feature 741 for the pivot 674 and a feature 743 for the pivot 574. As an example, the components 720 and 740 may include one or more additional features such as, for example, a feature 725 and a feature 745, respectively. As an example, these features may cooperate, for example, with respect to one or more other components.

Figure 7:
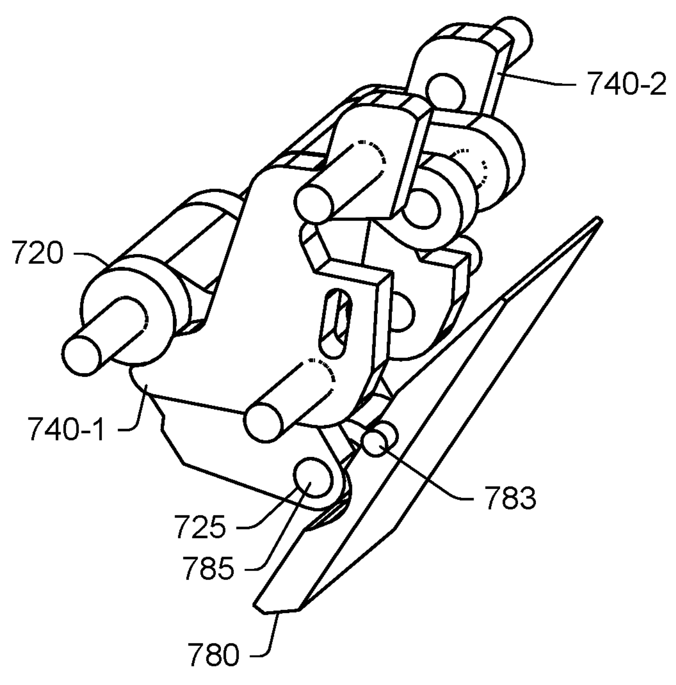
FIG. 7 is a series of diagrams of an example of a hinge assembly.
Figure 7:
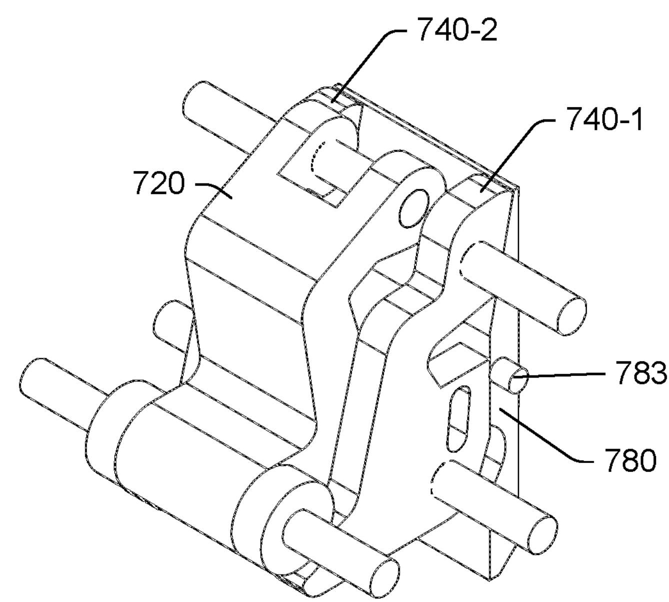

FIG. 7 shows perspective views of the hinge assembly 700 as including a movable cover 780 where the hinge assembly 700 is in an open position (top) and in a closed position (bottom). As shown in the example of FIG. 7, one or more of the components 720 and 740 may be duplicated, in whole or in part. For example, two instances of the component 740 may be included (see, e.g., FIG. 4) and the component 720 may include opposing sides with one or more features that may cooperate with each instance of the component 740. In particular, FIG. 7 shows components 740-1 and 740-2 as disposed adjacent to opposing sides of the component 720; noting that one instance of the component 740 may be sufficient for hinge operations.

As shown, the cover 780 can include a pivot 785 that cooperates with the feature 725 of the component 720 and may include a post 783 that cooperates with a housing feature (e.g., a feature of the base housing 500). For example, the base housing 500 may include a slot on one side of a recess where the post 783 may be received in the slot for translation (e.g., from one end to another end of the slot). As explained, in the example of FIG. 7, the components 720, 740 and 780 are in positions that correspond to an open position of the housings 500 and 600 of approximately 180 degrees (top) and in positions that correspond to a closed position of the housings 500 and 600 of approximately 0 degrees (bottom).

In the example of FIG. 7, the component 720 is disposed between two instances of the component 740, labeled as 740-1 and 740-2. As an example, the component 720 may be of a larger mass and/or volume that one of the components 740-1 and 740-2. In such an example, the cover 780 may be more securely carried and resistant to force that may be applied to an exterior surface of the cover 780 (e.g., if a device is dropped, banged against another object, etc.).

Figure 8:
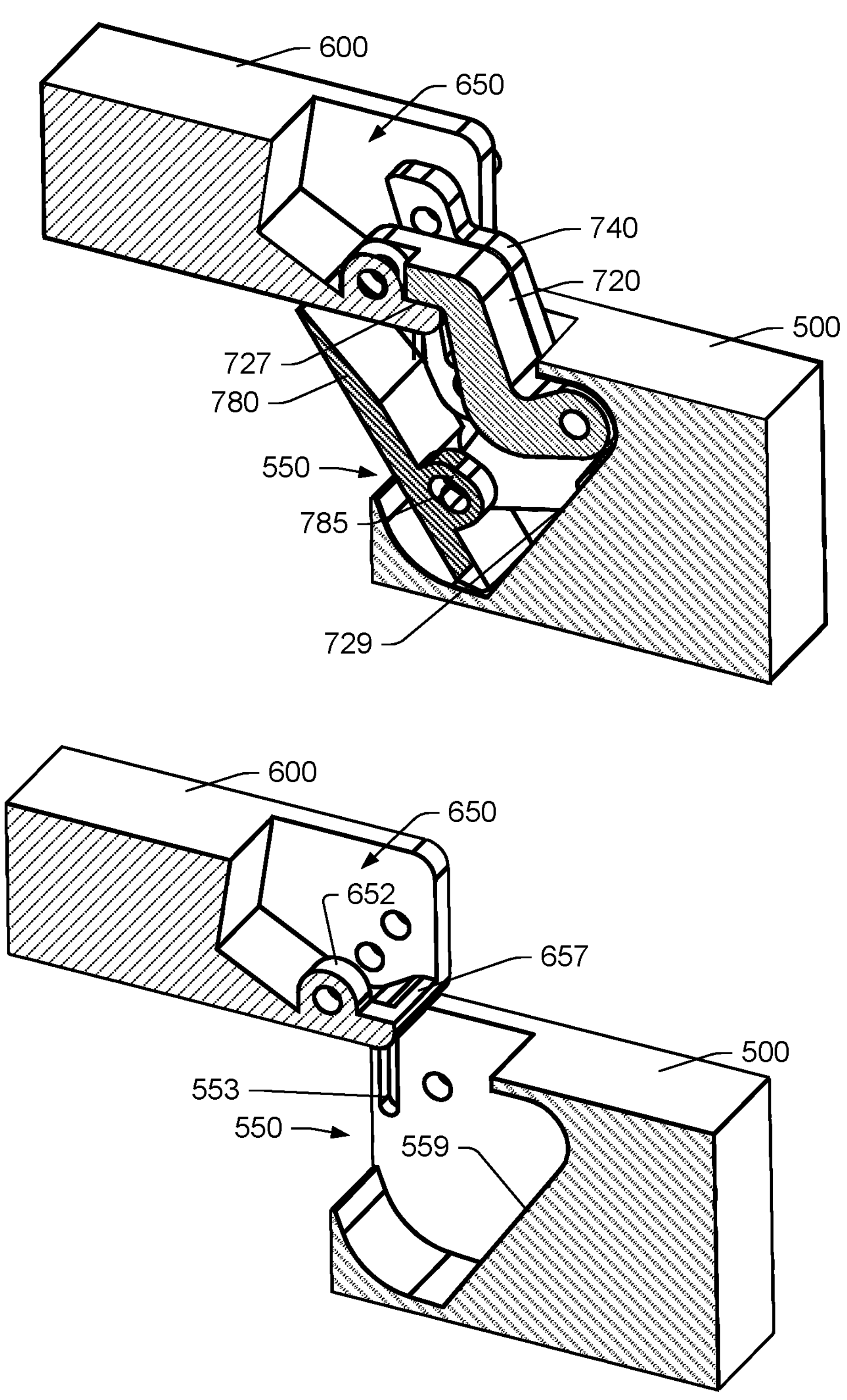
FIG. 8 is a series of diagrams of an example of a hinge assembly.

FIG. 8 shows perspective cross-sectional views of a portion of the hinge assembly 700 along with portions of housings 500 and 600 where the housing 500 includes a. As shown, the cover 780 may be included, which may include the pivot 785 that may be present as a bore that receives a post that may be the feature 725 or that may be received in the feature 725 such that the component 720 and the cover 780 may rotate with respect to each other, which, as explained, may be guided by one or more features such as, for example, the post 783 being received in a slot 553 of the recess 550 of the housing 500 such that the post 783 may be guided by the slot 553 as the housings 500 and 600 are transitioned between open and closed positions.

In the example of FIG. 8, the pivot 672 of the housing 600 is shown as including a boss 652 with a bore that may receive a post (e.g., an axle or a shaft) that is secured in opposing sides of the recess 650 (e.g., to form the pivot 672). As shown, the recess 650 can include a stop surface 657 that may contact a stop 727 of the component 720 when the housings 500 and 600 are in an open position (e.g., approximately 180 degrees open). As shown in the example of FIG. 8, the recess 550 can include a stop surface 559 that may contact a stop 729 of the component 720 when the housings 500 and 600 are in an open position (e.g., approximately 180 degrees). Thus, the component 720 may include multiple stops where, for example, one contacts a surface of the recess 650 of the housing 600 and another contacts a surface of the recess 550 of the housing 500.

Figure 9:
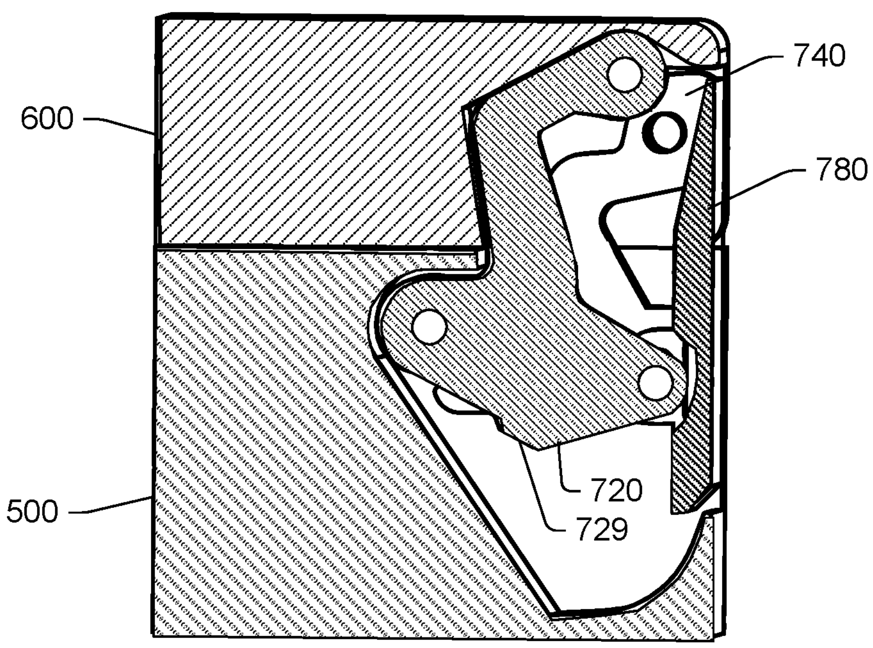
FIG. 9 is a series of diagrams of an example of a hinge assembly.
Figure 9:
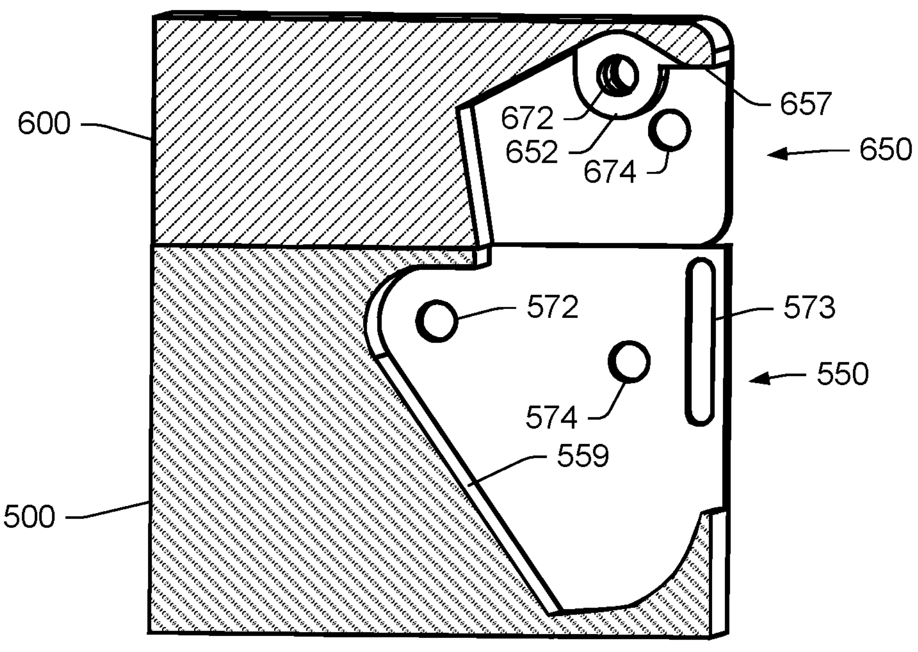

FIG. 9 shows perspective cross-sectional views of a portion of the hinge assembly 700 along with portions of housings 500 and 600. As shown, the cover 780 may be included, which may cover a portion of the recess 550 and a portion of the recess 650 when the housings 500 and 600 are in a closed position. As an example, one or more instances of the hinge assembly 700 may be included where one or more portions of a back edge or back edges of one or more housings may include one or more features (e.g., to a side of a hinge assembly, between hinge assemblies, etc.).

As shown in the example of FIG. 9, the recesses 550 and 650 of the housings 500 and 600 include openings to the back edge and to sides that are covered when the housings 500 and 600 are in a closed position. In such an example, the openings to the back edge may be covered by the cover 780, which may help to keep debris (e.g., dust, etc.) from entering into one or both of the recesses 550 and 650.

In the example of FIG. 9, the pivots 572, 574, 672 and 674 are shown, which may be provided as bores in the housings 500 and 600, respectively, which may provide for support of axles. As an example, a pivot can be defined by a pivot axis that may be a rotational axis for a component of a four-bar hinge assembly.

As an example, a computing device may include one or more tower hinge assemblies that can allow for access to a back of the computing device, which may include one or more ports, one or more cooling features, etc. As an example, a tower hinge assembly may provide for a notchless display housing outer cover or shell (e.g., back side, opposite a display side). As explained, a hinge assembly may utilize a crossed four-bar linkage that functions as a hinge that can also position a display housing in a manner that provides suitable clearance to rotate a full 180 degrees without requiring notches in an outer shell of a display housing or without requiring a large chamfer at the back of base housing (e.g., a keyboard housing). As an example, a computing device may be defined using terms A-cover, B-cover, C-cover and D-cover. For example, a display housing may include an A-cover as an outer or back side shell and a B-cover as a display side shell that may be or include a display bezel while a base housing (e.g., a keyboard housing) may include a D-cover as a bottom side shell and a C-cover as an opposing side shell, which may be a keyboard bezel. As an example, a hinge assembly may provide for desirable A-cover and C-cover features.

As an example, a device can include a first housing that includes a hinge recess that includes a stop surface, a first component pivot and a second component pivot of a four-bar linkage, where the first housing forms a first bar; a second housing that includes a hinge recess that includes a first component pivot and a second component pivot of the four-bar linkage, where the second housing forms a second bar; a first hinge component coupled to the first component pivots to form a third bar, where the first hinge component includes a second component stop surface and a stop that contacts the stop surface of the hinge recess of the first housing in a fully open position of the first housing and the second housing; and a second hinge component coupled to the second component pivots to form a fourth bar, where the second component includes a stop that contacts the second component stop surface in the fully open position of the first housing and the second housing. In such an example, the stop that contacts the second component stop surface may limit opening of the device to the fully open position.

As an example, a first housing may be a base housing and a second housing may be a display housing. As an example, a base housing may include a keyboard. As an example, a first housing may have a first thickness and a second housing may have a second thickness where the first thickness is greater than the second thickness.

As an example, a first housing can include a top surface and a bottom surface and a second housing can include a top surface and a bottom surface. In such an example, in a closed position of the first housing and the second housing, the bottom surface of the second housing may be disposed adjacent and parallel to the top surface of the first housing and/or, in a fully open position, a portion of the second housing may extend outwardly beyond a hinge recess end of the first housing and another portion of the second housing may be disposed adjacent and parallel to the top surface of the first housing. As an example, in a fully open position, a portion of a top surface of a second housing may be disposed adjacent and parallel to a top surface of a first housing.

As an example, a device can include a hinge recess cover that covers an end side of the hinge recess of a first housing and an end side of the hinge recess of a second housing. In such an example, the hinge recess cover may be pivotably coupled to a first hinge component of a hinge assembly. In such an example, the hinge recess of the first housing may include a hinge cover guide slot that guides pivotal movement of the hinge recess cover.

As an example, in an open position of a second housing with respect to a first housing, a gap may exist between a hinge recess end of the second housing and the first housing where, for example, the gap is a clearance gap for a corner of the second housing. For example, the gap may provide for the corner to rotate without interfering contact.

As an example, in a fully open position, a hinge recess end of a first housing may not be blocked by a second housing. In such an example, the hinge recess end of the first housing may include one or more interfaces, for example, consider one or more interfaces that may include one or more of an electrical interface and an air interface. As an example, a port may be an interface and a vent may be an interface.

As an example, a fully open position of a first housing and a second housing may be a 180 degree open position where a closed position of the first housing and the second housing may be a 0 degree position. In such an example, a device may include various open positions of the first housing and the second housing over a range of angles from approximately 90 degrees to 130 degrees. As an example, a four-bar linkage may be part of a hinge assembly that provides for a four-bar friction linkage that imparts friction force that counteracts gravitational force to maintain the first housing and the second housing in one of the open positions (e.g., consider a viewing position of a laptop type of computing device as may be supported on a tabletop, a countertop, a desktop, etc.).

As an example, a method may include, in a computing device that includes a base housing and a display housing coupled via a four-bar linkage hinge, supporting the display housing in an open position with respect to the base housing where, in the open position, the display housing is oriented orthogonally at approximately 90 degrees to the base housing and disposed a distance away from the base housing to form a corner clearance gap for clearance of a corner of the display housing for full opening of the display housing with respect to the base housing to an angle of approximately 180 degrees.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
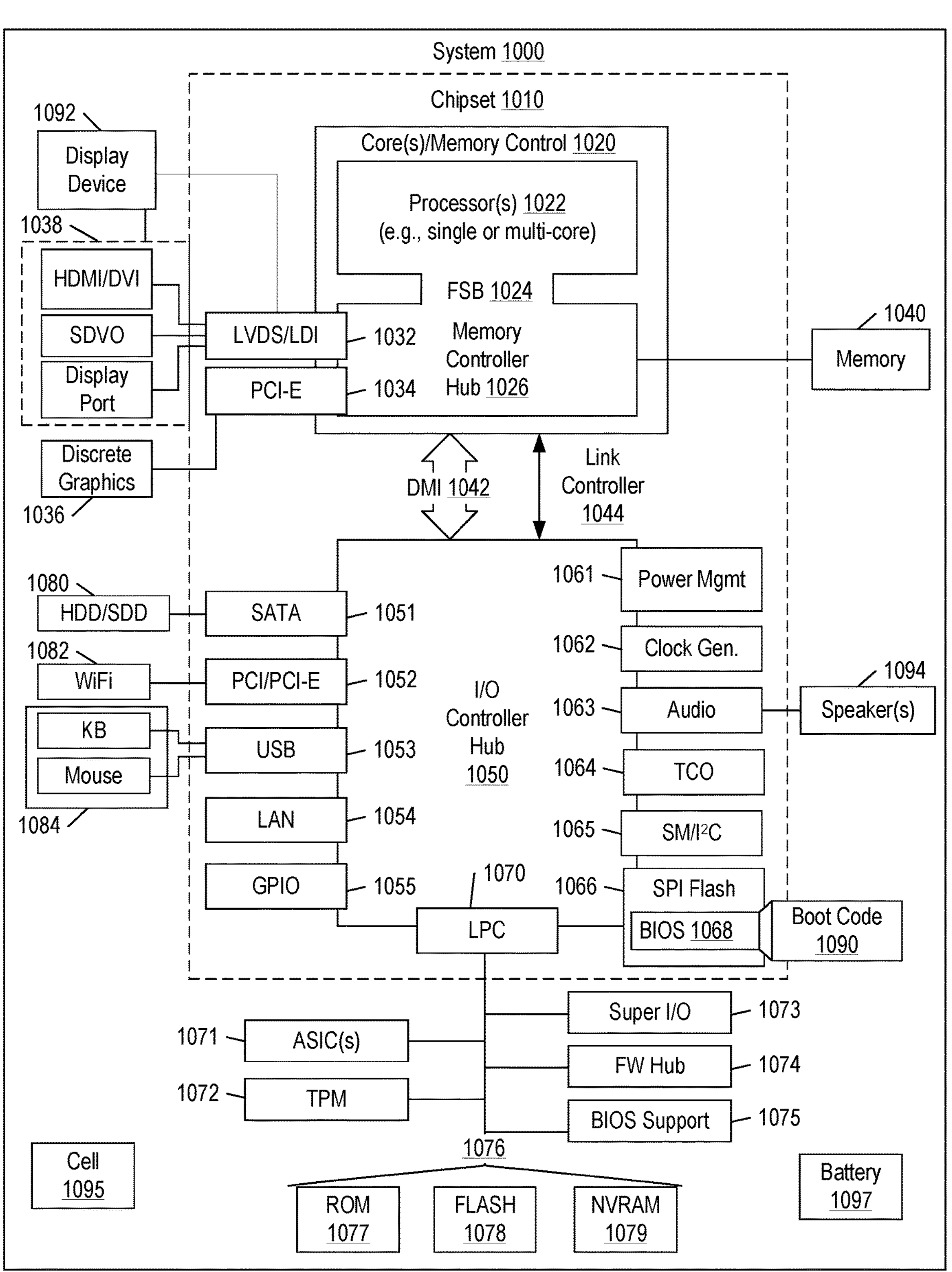
FIG. 10 is a diagram of an example of a system that includes one or more processors.

While various examples of circuits or circuitry have been discussed, FIG. 10 depicts a block diagram of an illustrative computer system 1000. The system 1000 may be a computer system, such as one of the THINKCENTER or THINKPAD series of personal computers sold by Lenovo (US) Inc. of Morrisville, NC, or a workstation computer system, such as the THINKSTATION, which are sold by Lenovo (US) Inc. of Morrisville, NC; however, as apparent from the description herein, a system or other machine may include other features or only some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL, AMD, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., $I^2C$, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an $I^2C$ interface (see, e.g., the SM/$I^2C$ interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:

a first housing that comprises a hinge recess that comprises a stop surface, a first component pivot and a second component pivot of a four-bar linkage, wherein the first housing forms a second bar;

a second housing that comprises a hinge recess that comprises a first component pivot and a second component pivot of the four-bar linkage, wherein the second housing forms a first bar;

a first hinge component coupled to the first component pivots to form a third bar, wherein the first hinge component comprises a second component stop surface and a stop that contacts the stop surface of the hinge recess of the first housing in a fully open position of the first housing and the second housing; and a second hinge component coupled to the second component pivots to form a fourth bar, wherein the second component comprises a stop that contacts the second component stop surface in the fully open position of the first housing and the second housing.

2. The device of claim 1, wherein the stop that contacts the second component stop surface limits opening of the device to the fully open position.

3. The device of claim 1, wherein the first housing comprises a base housing and wherein the second housing comprises a display housing.

4. The device of claim 1, wherein the first housing comprises a first thickness and wherein the second housing comprises a second thickness wherein the first thickness is greater than the second thickness.

5. The device of claim 1 wherein the first housing comprises a top surface and a bottom surface and wherein the second housing comprises a top surface and a bottom surface.

6. The device of claim 5, wherein, in a closed position of the first housing and the second housing, the bottom surface of the second housing is disposed adjacent and parallel to the top surface of the first housing.

7. The device of claim 5, wherein, in the fully open position, a portion of the second housing extends outwardly beyond a hinge recess end of the first housing and another portion of the second housing is disposed adjacent and parallel to the top surface of the first housing.

8. The device of claim 5, wherein, in the fully open position, a portion of the top surface of the second housing is disposed adjacent and parallel to the top surface of the first housing.

9. The device of claim 1, comprising a hinge recess cover that covers an end side of the hinge recess of the first housing and an end side of the hinge recess of the second housing.

10. The device of claim 9, wherein the hinge recess cover is pivotably coupled to the first hinge component.

11. The device of claim 10, wherein the hinge recess of the first housing comprises a hinge cover guide slot that guides pivotal movement of the hinge recess cover.

12. The device of claim 1, wherein, in an open position of the second housing with respect to the first housing, a gap exists between a hinge recess end of the second housing and the first housing.

13. The device of claim 12, wherein the gap is a clearance gap for a corner of the second housing.

14. The device of claim 1, wherein, in the fully open position, a hinge recess end of the first housing is not blocked by the second housing.

15. The device of claim 14, wherein the hinge recess end of the first housing comprises one or more interfaces.

16. The device of claim 15, wherein the one or more interfaces comprise one or more of an electrical interface and an air interface.

17. The device of claim 1, wherein the fully open position is a 180 degree open position and wherein a closed position of the first housing and the second housing is a 0 degree position.

18. The device of claim 17, comprising open positions of the first housing and the second housing over a range of angles from approximately 90 degrees to 130 degrees.

19. The device of claim 18, wherein the four-bar linkage comprises a four-bar friction linkage that imparts friction force that counteracts gravitational force to maintain the first housing and the second housing in one of the open positions.

20. A method comprising:

in a computing device that comprises a base housing and a display housing coupled via a four-bar linkage hinge wherein the base housing forms a second bar, the display housing forms a first bar, a first hinge component forms a third bar, and a second hinge component forms a fourth bar, supporting the display housing in an open position with respect to the base housing wherein, in the open position, the display housing is oriented orthogonally at approximately 90 degrees to the base housing and disposed a vertical distance away from the base housing to form a corner clearance gap for clearance of a corner of the display housing for full opening of the display housing with respect to the base housing to an angle of approximately 180 degrees in a stepped open position, wherein at the angle of approximately 180 degrees, the stepped open position is formed by the corner of the display housing remaining vertically over the base housing and inset a distance from a back edge of the base housing to form a stepped overlap between the display housing and the base housing.

* * * * *